(12) United States Patent
Han et al.

(10) Patent No.: US 10,619,697 B2
(45) Date of Patent: Apr. 14, 2020

(54) HYDRAULIC ENGINE MOUNT

(71) Applicants: Hyundai Motor Company, Seoul (KR); Kia Motors Corporation, Seoul (KR); Pyung Hwa Industrial Co., Ltd., Daegu (KR)

(72) Inventors: Sang-Hoon Han, Gyeonggi-do (KR); Byeong-Gon Lee, Daegu (KR)

(73) Assignees: Hyundai Motor Company, Seoul (KR); Kia Motors Corporation, Seoul (KR); Pyung Hwa Industrial Co., Ltd., Daegu (KR)

( * ) Notice: Subject to any disclaimer, the term of this patent is extended or adjusted under 35 U.S.C. 154(b) by 0 days.

(21) Appl. No.: 15/827,974

(22) Filed: Nov. 30, 2017

(65) Prior Publication Data

US 2019/0063542 A1  Feb. 28, 2019

(30) Foreign Application Priority Data

Aug. 30, 2017  (KR) ......................... 10-2017-0109975

(51) Int. Cl.
*F16F 13/10* (2006.01)
*B60K 5/12* (2006.01)

(52) U.S. Cl.
CPC ............ *F16F 13/10* (2013.01); *B60K 5/1208* (2013.01); *B60K 5/1225* (2013.01);
(Continued)

(58) Field of Classification Search
CPC ...... F16F 13/106; F16F 13/103; F16F 13/105; F16F 13/264; F16F 13/107; F16F 13/266; F16F 13/268; F16F 13/102
(Continued)

(56) References Cited

U.S. PATENT DOCUMENTS 5,340,093 A * 8/1994 Rudolph ............... F16F 13/106
267/140.13
2003/0030202 A1 * 2/2003 Thomazeau .......... F16F 13/103
267/140.13
(Continued)

FOREIGN PATENT DOCUMENTS

KR        10-1288995         7/2013
KR     10-2014-0044485       4/2014
(Continued)

*Primary Examiner* — Bradley T King
*Assistant Examiner* — Stephen M Bowes
(74) *Attorney, Agent, or Firm* — Mintz Levin Cohn Ferris Glovsky and Popeo, P.C.; Peter F. Corless

(57) ABSTRACT

A hydraulic engine mount is provided in which related components out of two or more internal parts are coupled to reduce the number of components and to prevent oil leakage occurring due to coupling of the parts. The hydraulic engine mount includes a core that has a central bolt inserted into a central portion thereof, a rubber member formed on an outer circumferential surface of the core, upper and lower fluid chambers to seal a fluid therein. A diaphragm is disposed at a lower end of the lower fluid chamber and an orifice assembly divides the upper and lower fluid chambers from each other and has nozzle upper and lower plates. A nozzle upper plate-combined case that has a flow path is formed integrally with a lower part of the rubber member, and a lower part of the flow path is hermetically sealed by the nozzle lower plate.

6 Claims, 9 Drawing Sheets

(52) U.S. Cl.
CPC .......... *F16F 13/103* (2013.01); *F16F 13/105* (2013.01); *F16F 13/107* (2013.01); *F16F 2224/0208* (2013.01); *F16F 2226/04* (2013.01); *F16F 2230/30* (2013.01)

(58) Field of Classification Search
USPC .................................................. 267/140.13
See application file for complete search history.

(56) References Cited

U.S. PATENT DOCUMENTS

| | | | | |
|---|---|---|---|---|
| 2003/0038414 A1* | 2/2003 | Pizanti | .................. | F16F 13/103 |
| | | | | 267/140.13 |
| 2003/0047855 A1* | 3/2003 | Takashima | ............ | F16F 13/101 |
| | | | | 267/140.11 |
| 2004/0212133 A1* | 10/2004 | Thomazeau | .......... | F16F 13/106 |
| | | | | 267/140.13 |
| 2006/0006593 A1* | 1/2006 | Bretaudeau | ........... | F16F 13/268 |
| | | | | 267/140.14 |
| 2013/0264756 A1* | 10/2013 | Daito | ...................... | F16F 13/08 |
| | | | | 267/140.13 |
| 2014/0159292 A1* | 6/2014 | Kim | ......................... | F16F 6/00 |
| | | | | 267/140.14 |
| 2014/0175719 A1* | 6/2014 | Kanaya | ................. | F16F 13/106 |
| | | | | 267/140.13 |

FOREIGN PATENT DOCUMENTS

| | | |
|---|---|---|
| KR | 10-1428277 | 8/2014 |
| KR | 10-1585429 | 1/2016 |

\* cited by examiner

HYDRAULIC ENGINE MOUNT

CROSS-REFERENCE TO RELATED APPLICATION

This application claims the priority benefit of Korean Patent Application No. 10-2017-0109975, filed on Aug. 30, 2017, the disclosure of which is incorporated herein by reference.

BACKGROUND

1. Field of the Invention

The present invention relates to a hydraulic engine mount, and more particularly, to a hydraulic engine mount in which related components out of two or more internal parts constituting the mount are coupled to reduce the number of components and to prevent oil leakage occurring due to coupling of the components.

2. Description of the Related Art

In general, a vehicle engine is installed in an engine compartment of a vehicle body through an engine mount to reduce vibration of the engine. For engine mounts, a rubber engine mount using elasticity of a material thereof and a hydraulic engine mount in which a fluid is sealed and thus vibration is reduced using viscosity resistance caused by fluid flow have been developed. There among, the hydraulic engine mount is configured to simultaneously reduce vibration of a high frequency domain and a low frequency domain and is thus widely used in various types of vehicles.

FIG. 1 illustrates a structure of a conventional hydraulic engine mount according to the related art. Referring to FIG. 1, in the hydraulic engine mount, a designated amount of a hydraulic fluid is sealed in an internal space between a rubber member 3 and a diaphragm 5, and a nozzle plate unit 4 is installed between the rubber member 3 and the diaphragm 5 and thus divides the internal space into an upper fluid chamber 7 and a lower fluid chamber 8.

The nozzle plate unit 4 is formed by coupling an upper plate 4a (referred to as a nozzle upper plate) positioned at an upper region and a lower plate 4b (referred to as a nozzle lower plate) positioned at a lower region and a ring-shaped flow path communicating the upper fluid chamber 7 and the lower fluid chamber 8 with each other is formed at the edge of the nozzle plate unit 4 to allow the hydraulic fluid to flow in the flow path. Further, to improve dynamic characteristics, a membrane 6 is installed near a region in which a center aperture of the nozzle upper plate 4a and a center aperture of the nozzle lower plate 4b are coupled. The rubber member 3 is coupled with a core 2 and load of an engine is transmitted to the core 2.

Therefore, the rubber member 3, which is formed of synthetic rubber or synthetic resin and thus has elasticity, is elastically compressed and restored repeatedly according to change in load of the engine and vibration. In particular, the hydraulic fluid sealed in the hydraulic engine mount flows into the upper fluid chamber 7 and the lower fluid chamber 8 through the flow path. However, the above-described hydraulic engine mount has problems as follows.

First, oil leakage at the coupling region between parts forming the flow path, i.e., the nozzle upper plate and the nozzle lower plate of the nozzle plate unit, may occur.

Second, when a nozzle assembly is inserted into a case and then curling of the case is performed, oil leakage may occur due to peeling-off of the nozzle upper plate by force applied in the inward direction.

Third, production costs of parts may be increased due to the increased number of molds necessary to produce the parts and the increased number of manufacturing processes.

Fourth, dynamic characteristics and damping functions may be decreased due to oil leakage occurring during coupling between the nozzle upper plate and the nozzle lower plate and thus noise, vibration and harshness (NVH) may occur.

Therefore, the present invention provides a hydraulic engine mount in which a nozzle upper plate is formed integrally with a rubber member so that a conventional nozzle upper plate may be removed, the rubber member is transformed so that a flow path is formed therein and the flow path is sealed by a nozzle lower plate to reduce the number of molds and the number of manufacturing processes.

SUMMARY

Therefore, the present invention provides a hydraulic engine mount in which related components out of two or more internal parts of the mount are coupled to reduce the number of components and production costs of the components and to prevent oil leakage occurring due to coupling of the parts. Technical objects to be achieved by the present invention are not limited to those mentioned above, and other objects may be clearly understood by those skilled in the art from the description given below.

In accordance with an aspect of the present invention, a hydraulic engine mount may include a core having a central bolt, engaged with an engine, inserted into a central portion of the core, and a rubber member formed on an outer circumferential surface of the core, the core and the rubber member being disposed in a bracket housing, an upper fluid chamber that contacts the core and the rubber member to seal a fluid therein, a lower fluid chamber disposed under the upper fluid chamber to seal the fluid therein, a diaphragm disposed at a lower end of the lower fluid chamber, and an orifice assembly that divides the upper fluid chamber and the lower fluid chamber from each other and includes a nozzle upper plate and a nozzle lower plate, wherein a nozzle lower plate-combined case that has a flow path formed therein is formed integrally with a lower part of the rubber member, and a lower part of the flow path is hermetically sealed by the nozzle lower plate located under the flow path.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
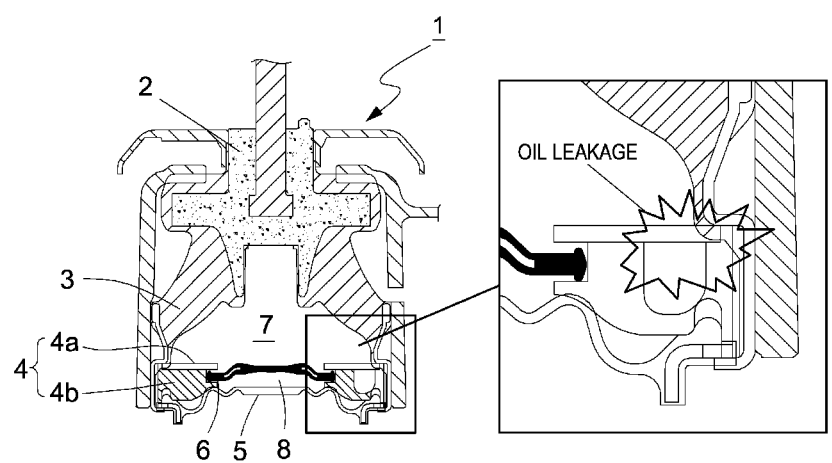
FIG. 1 is a cross-sectional view of a conventional hydraulic engine mount according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, it is to be understood that the detailed description, which will be disclosed along with the accompanying drawings, is intended to describe the exemplary embodiments of the present invention and is not intended to represent all technical ideas of the present invention.

In order to clearly describe the present invention, parts which are not related to the description will be omitted, and the same or similar elements throughout the specification are denoted by the same reference numerals even though they are depicted in different drawings. In addition, the terms or words used in the specification and claims of the present invention are not to be interpreted as having typical or dictionary meanings, and are to be interpreted as having meanings and concepts conforming to the technical sprit of the present invention based on the principle that the inventors can appropriately define the concepts of the terms to explain the present invention in the best manner.

Now, exemplary embodiments of the present invention will be described in detail with reference to the accompanying drawings.

Figure 2:
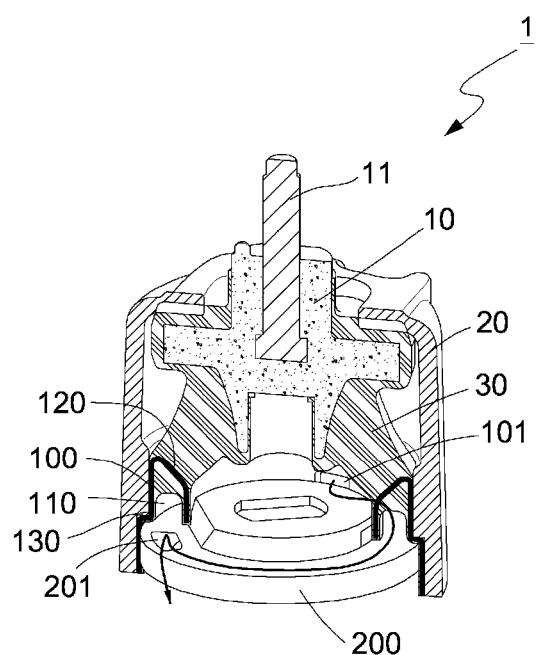
FIG. 2 is a perspective cross-sectional view of a hydraulic engine mount in accordance with an exemplary embodiment of the present invention.

FIG. 2 is a perspective cross-sectional view of a hydraulic engine mount in accordance with an exemplary embodiment of the present invention. The hydraulic engine mount may include a core 10 having a central bolt 11 engaged with an engine and inserted into a central portion of the core 10, and a rubber member 30 formed on an outer circumferential surface of the core 10, the core 10 and the rubber member 30 disposed in a bracket housing 20, an upper fluid chamber 40 that contacts the core 10 and the rubber member 30 to seal a fluid therein, a lower fluid chamber 50 disposed under the upper fluid chamber 40 to seal the fluid therein, a diaphragm 60 disposed at the lower end of the lower fluid chamber 50, and an orifice assembly OA that divides the upper fluid chamber 40 and the lower fluid chamber 50 from each other and includes a nozzle upper plate and a nozzle lower plate, in the same manner as a conventional hydraulic engine mount.

However, in the hydraulic engine mount in accordance with an exemplary embodiment of the present invention, a nozzle upper plate-combined case 100 having a flow path 110 formed therein may be formed integrally with a lower part of the rubber member 30, and a lower part of the flow path 110 may be hermetically sealed by a nozzle lower plate 200 disposed under the flow path 110. For example, the nozzle upper plate-combined case 200 may be formed at the lower part of the rubber member 30 using vulcanization molding and, the ring-shaped flow path 110 may be formed in the lower part of the nozzle upper plate-combined case 100.

Figure 3:
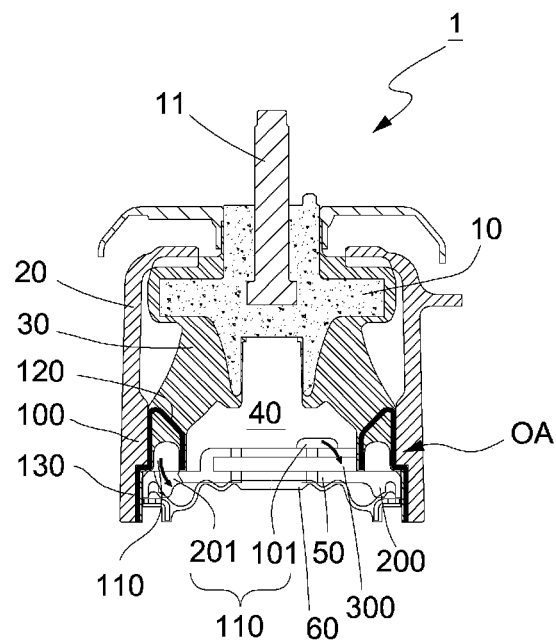
FIG. 3 is a perspective cross-sectional view illustrating a flow within a flow path of the hydraulic engine mount in accordance with an exemplary embodiment of the present invention.

Further, the nozzle upper plate-combined case 100, as exemplarily shown in FIGS. 2 and 3, may include an inward bending part 120 inclined inwards to maintain the shape of the flow path 110 when the rubber member 30 may be vulcanized, and a vertical protruding part 130 formed in the outward direction. The inward bending part 120 contacts the upper surface of the nozzle lower plate 200, and the vertical protruding part 130 formed in the outward direction contacts the outer wall of the nozzle lower plate 200.

The lengths and widths (areas) of the inward bending part 120 and the vertical protruding part 130 may be varied based on the shape and size of the nozzle lower plate 200. In particular, the nozzle upper plate-combined case 100 may be formed of a metal, particularly, steel or aluminum, or be a molded product formed of synthetic resin. Further, the lower part of the flow path 110 may be hermetically sealed by the nozzle lower plate 200 disposed under the flow path 110, as exemplarily shown in FIG. 2.

Figure 4A:
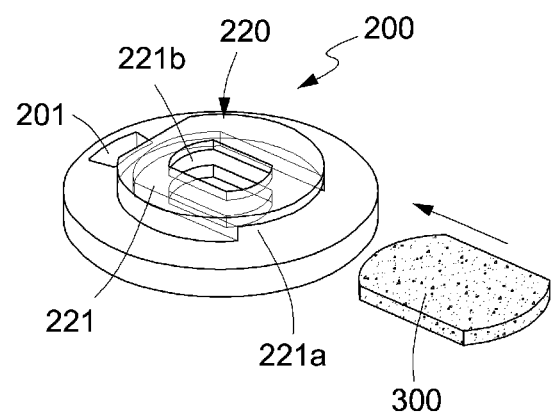
FIG. 4A is a perspective view illustrating the nozzle lower plate before a membrane is inserted into the nozzle lower plate in accordance with an exemplary embodiment of the present invention.
Figure 4B:
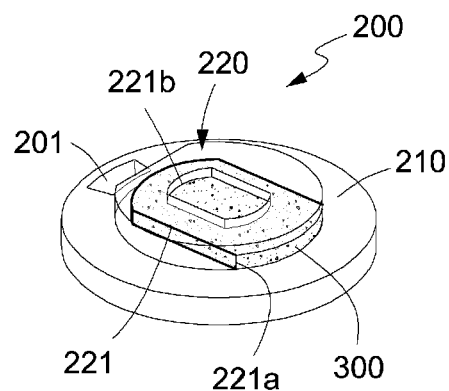
FIG. 4B is a perspective view illustrating the nozzle lower plate after the membrane is inserted into the nozzle lower plate in accordance with an exemplary embodiment of the present invention.

The nozzle lower plate 200 is an injection molded product and may include a lower body 210 having a circular shape and an upper body 220 having a circular shape with a smaller size than the lower body 210. In particular, the lower body 210 and the upper body 220 may be stacked, as exemplarily shown in FIGS. 4A and 4B. The lower body 210 and the upper body 220 may be integrally formed through injection molding. The lower body 210 may have a hollow structure having an aperture formed therein and may include a flow path outlet 201 formed at one side thereof, i.e., a side of the lower body 210 that crosses a second opening 221b of a fixing part 221, which will be described later, at right angles, and the fixing part 221 to fix a membrane 300 inserted thereinto may be formed in the upper body 220.

Particularly, the fixing part 221 may include a first opening 221a opened from the left side to the right side of the fixing part 221 to allow the membrane 300 to be inserted into the first opening 221a from the side in a sliding manner, and the second opening 221b formed at the upper region of the fixing part 221 so that the membrane 330 sufficiently damps vibration transmitted from the upper fluid chamber 40. The flow path 110 formed in the lower part of the nozzle upper plate-combined case 100 may include a flow path inlet 101 formed at any one part of the inner surface of the nozzle upper plate-combined case 100, and the flow path outlet 201 formed at the lower end surface of the nozzle lower plate 200 that contacts the flow path 110 to hermetically seal the flow path 110, as exemplarily shown in FIG. 3.

Figure 5A:
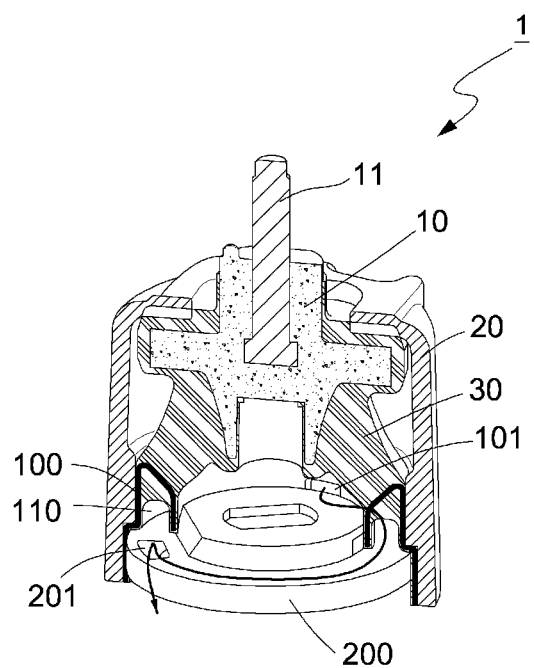
FIG. 5A is a perspective cross-sectional view illustrating a flow within the flow path in accordance with an exemplary embodiment of the present invention.

As shown in FIG. 5A, the flow path outlet 201 formed at the nozzle lower plate 200 forms an inclined surface having a curved shape and thus facilitates a flow of the fluid passed through the flow path 110. After the membrane 300 is inserted into the fixing part 221 in the sliding manner, the first opening 221a may be closed by the rubber member 30 or the nozzle upper plate-combined case 100, thus preventing separation of the membrane 300 from the fixing part 221.

Figure 5B:
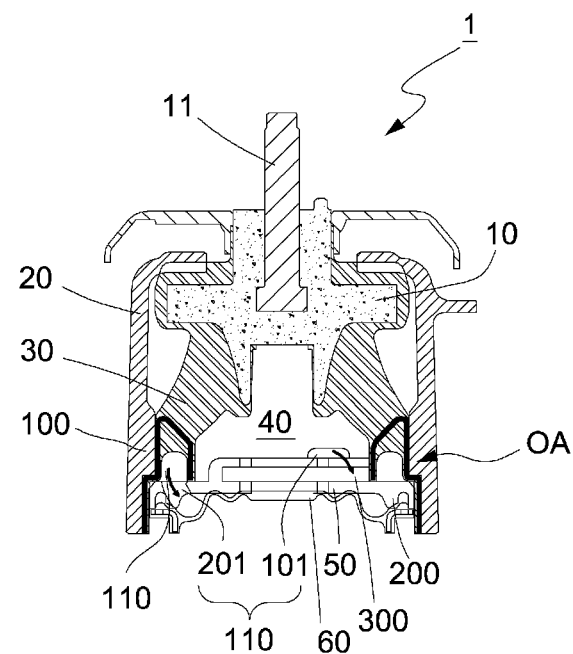
FIG. 5B is a cross-sectional view illustrating the flow within the flow path in accordance with an exemplary embodiment of the present invention.

Although this exemplary embodiment illustrates the flow path outlet 201 as being formed at a position facing the first opening 221a, the position of the flow path outlet 201 may be varied to improve required performance of a vehicle. The flow path outlet 201 contacts the flow path 110 formed integrally with the lower part of the nozzle upper plate-combined case 100, and the first opening 221a may be hermetically sealed by the nozzle upper plate-combined case 110 or the rubber member 30, as exemplarily shown in FIG. 5B.

Figure 6A:
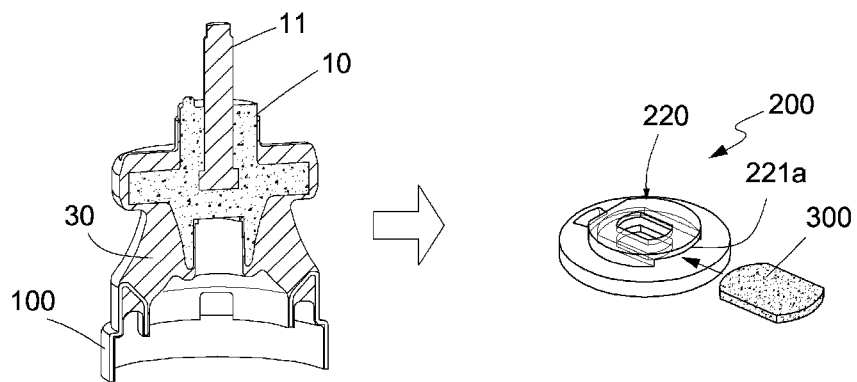
FIGS. 6A to 6B are views illustrating a process of manufacturing the hydraulic engine mount in accordance with an exemplary embodiment of the present invention.
Figure 6B:
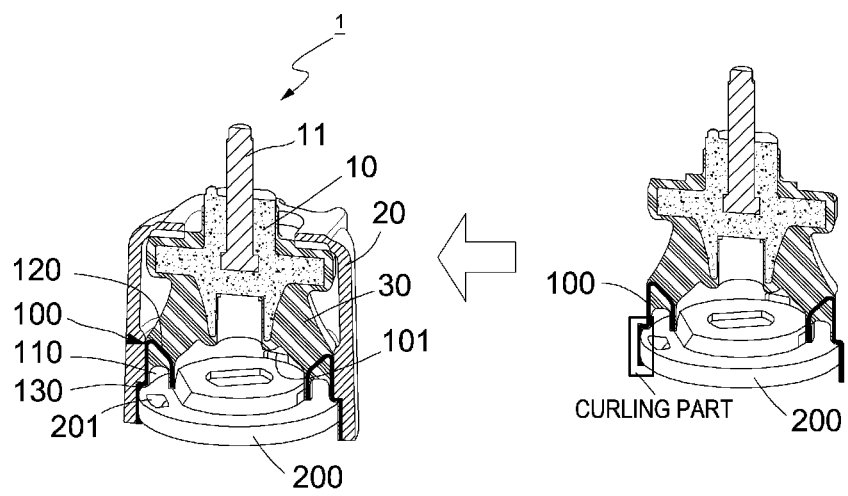

The above-described hydraulic engine mount is manufactured by a method shown in FIGS. 6A-6B. First, the rubber member 30 and the nozzle upper plate-combined case 100 may be formed simultaneously through vulcanization molding. Thereafter, the nozzle lower plate 200 may be inserted into the nozzle upper plate-combined case 100. Prior to insertion of the nozzle lower plate 200 into the nozzle upper plate-combined case 100, the membrane 300 may be inserted into the first opening 221a formed at the fixing part 221 of the nozzle lower plate 200 in a sliding manner.

Thereafter, curling of the nozzle upper plate-combined case 100 may be executed under the condition that the nozzle lower plate 200 is inserted into the nozzle upper plate-combined case 100. The nozzle upper plate-combined case 100 may then be fitted into the bracket housing 20 by pressing, thus completing manufacture of the hydraulic engine mount. Therefore, the above-described method in accordance with the present invention may solve problems of the conventional method, i.e., prevent peeling-off of a nozzle upper plate due to press-fitting of the nozzle upper plate into a nozzle lower plate and decreasing of performance of the hydraulic engine mount due to oil leakage thereby.

Figure 7:
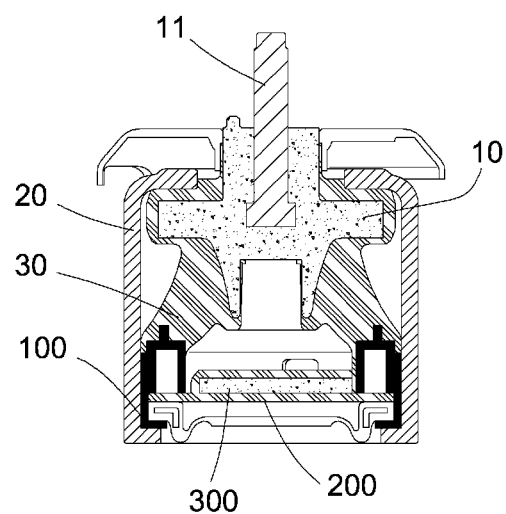
FIG. 7 is a cross-sectional view illustrating a nozzle upper plate-combined case in accordance with an exemplary embodiment of the present invention, manufactured through injection molding (using aluminum or synthetic resin)

In other words, peeling-off of the nozzle upper plate may be prevented by omitting the nozzle upper plate, preparing the nozzle upper plate-combined case 100 serving as the nozzle upper plate, inserting the nozzle lower plate 200 into the nozzle upper plate-combined case 100 and curling the nozzle upper plate-combined case 100. Further, in the present invention, the nozzle upper plate may be omitted and, thus, costs of a mold to manufacture the nozzle upper plate may be eliminated. Although this exemplary embodiment illustrates the nozzle upper plate-combined case 100 as being formed of a metal, such as steel or aluminum, the nozzle upper plate-combined case 100 may be manufactured using synthetic resin, as exemplarily shown in FIG. 7.

Figure 8A:
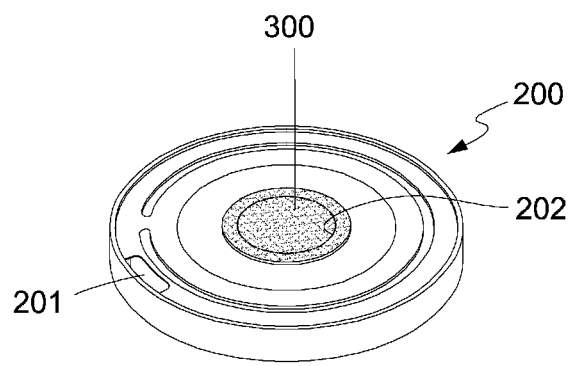
FIGS. 8A and 8B are perspective and cross-sectional views of a nozzle lower plate in accordance with another exemplary embodiment of the present invention.
Figure 8B:
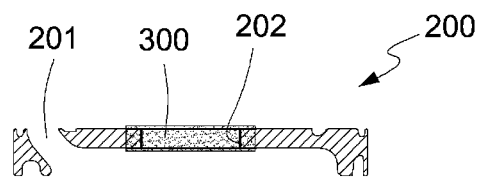

FIGS. 8A and 8B are perspective and cross-sectional views of a nozzle lower plate in accordance with another exemplary embodiment of the present invention. In this exemplary embodiment, a nozzle lower plate 200 may be formed to have a disc shape, a flow path outlet 201 that communicates with a space formed on the nozzle lower plate 20 and a space formed under the nozzle lower plate 200 may be formed at one side of the nozzle lower plate 200, and an opening 202 may be formed at the center of the nozzle lower plate 200 in the vertical direction.

Since the nozzle lower plate 200 employs a structure in which a membrane 300 is formed integrally with the opening 202 of the above nozzle lower plate 200 through vulcanization and thus completely closes the opening 202, assembly of the hydraulic engine mount may be simplified and manufacturing costs of the hydraulic engine mount may be reduced. As is apparent from the above description, a hydraulic engine mount in accordance with the present invention has effects, as below.

First, a case with which a nozzle upper plate is integrated may be formed at a rubber member through vulcanization and, thus, manufacturing costs of the hydraulic engine mount may be reduced due to reduction in the number of overall components.

Second, a conventional nozzle upper plate may be omitted and the case having a structure in which a flow path is formed in the case and the flow path may be sealed by a nozzle lower plate located under the flow path is employed and, thus, peeling-off of the nozzle upper plate occurring due to coupling of the conventional nozzle upper and lower plates (through press-fitting or welding) and oil leakage caused thereby may be prevented.

Third, as compared to a conventional hydraulic engine mount in which nozzle upper and lower plates are coupled through press-fitting or welding after a membrane is installed therebetween, the hydraulic engine mount in accordance with the present invention has a structure into which a membrane may be inserted separately and may thus prevent interference with other structures and improve noise, vibration and harshness (NVH) and vehicle driving problems generated due to reduction of dynamic characteristics and damping functions caused by oil leakage.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hydraulic engine mount, comprising:
   a core having a central bolt engaged with an engine and inserted into a central portion of the core, and a rubber member formed on an outer circumferential surface of the core, the core and the rubber member being disposed in a bracket housing;
   an upper fluid chamber that contacts the core and the rubber member to seal a fluid therein;
   a lower fluid chamber disposed under the upper fluid chamber to seal the fluid therein;
   a diaphragm disposed at a lower end of the lower fluid chamber;
   a nozzle upper plate-combined case having a flow path formed therein is formed integrally with a lower part of the rubber member; and an orifice assembly that divides the upper fluid chamber and the lower fluid chamber from each other and includes the nozzle upper plate-combined case and a nozzle lower plate, wherein the nozzle upper plate-combined case includes an inward bending part inclined inwards to maintain a shape of the flow path when the rubber member is vulcanized, and a vertical protruding part formed in an outward direction, wherein a lower part of the flow path is hermetically sealed by the nozzle lower plate disposed under the flow path, wherein the nozzle lower plate is formed by integrally injection-molding a lower body having a hollow structure and an upper body formed on the lower body and including a fixing part that protrudes to fix a membrane inserted thereinto, and wherein the fixing part includes:
  a first opening formed through one of left and right surfaces of the fixing part to insert the membrane into the fixing part in a sliding manner through the first opening from the side; and
  a second opening formed at the center of an upper surface of the fixing part to dampen vibration transmitted from the upper fluid chamber.

2. The hydraulic engine mount according to claim 1, wherein the nozzle upper plate-combined case is formed through pressing or injection molding.

3. The hydraulic engine mount according to claim 1, wherein the flow path includes a flow path inlet formed at any one part of an inner surface of the nozzle upper plate-combined case and a flow path outlet formed at a lower end surface of the nozzle lower plate that contacts the flow path to hermetically seal the flow path.

4. The hydraulic engine mount according to claim 1, wherein, after the membrane is inserted into the fixing part, the first opening is sealed by the rubber member or the nozzle upper plate-combined case to prevent separation of the membrane.

5. A method of manufacturing the hydraulic engine mount of claim 1, comprising:
  forming the rubber member and the nozzle upper plate-combined case including the inward bending part inclined inwards to maintain the shape of the flow path and the vertical protruding part formed in the outward direction through vulcanization molding;
  forming the nozzle lower plate by integrally injection-molding the lower body having the hollow structure and the upper body formed on the lower body and including the fixing part that protrudes to fix the membrane inserted thereinto;
  forming the first opening formed through one of left and right surfaces of the fixing part to insert the membrane into the fixing part in a sliding manner through the first opening from the side;
  forming the second opening formed at the center of the upper surface of the fixing part to dampen vibration transmitted from the upper fluid chamber;
  inserting the nozzle lower plate into the nozzle upper plate-combined case; and
  inserting the membrane into an opening formed at a fixing part of the nozzle lower plate.

6. The method of claim 5, further comprising:
  curling the nozzle upper plate-combine case when the nozzle lower plate is inserted into the nozzle upper plate-combined case;
  fitting the nozzle upper plate-combined case into the bracket housing by pressing.

* * * * *